(12) United States Patent
He et al.

(10) Patent No.: US 8,210,437 B2
(45) Date of Patent: Jul. 3, 2012

(54) DATA CAPTURE TERMINAL WITH AUTOMATIC FOCUSING OVER A LIMITED RANGE OF WORKING DISTANCES

(75) Inventors: Duanfeng He, South Setauket, NY (US); Bradley Carlson, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 137 days.

(21) Appl. No.: 12/717,321

(22) Filed: Mar. 4, 2010

(65) Prior Publication Data

US 2011/0215153 A1  Sep. 8, 2011

(51) Int. Cl.
*G06K 7/10* (2006.01)
(52) U.S. Cl. .................... 235/470; 235/462.15
(58) Field of Classification Search ............ 235/470, 235/13–15, 18, 25
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,121,154 A * | 6/1992 | Yamada et al. | 396/104 |
| 5,304,786 A | 4/1994 | Pavlidis et al. | |
| 5,703,349 A | 12/1997 | Meyerson et al. | |
| 6,478,225 B1 | 11/2002 | Swartz et al. | |
| 7,077,320 B2 * | 7/2006 | Kawai | 235/462.14 |
| 7,097,101 B2 * | 8/2006 | Kogan et al. | 235/454 |
| 7,481,372 B2 * | 1/2009 | Wulff et al. | 235/462.48 |

OTHER PUBLICATIONS

International Search Report and Written Opinion dated Mar. 29, 2011 in related case PCT/US2010/0060181.

* cited by examiner

*Primary Examiner* — Daniel St. Cyr
(74) *Attorney, Agent, or Firm* — Nong-Qiang Fan

(57) ABSTRACT

A data capture terminal for, and a method of, automatically capturing data from targets located within a range of working distances from the terminal, employ a controller for automatically controlling a set of focal parameters of an imaging assembly, for storing one of the focal parameters of the imaging assembly upon a successful data capture from a first target, and for automatically selecting a subset of the focal parameters determined from the stored focal parameter to capture data from a second target. The subset is smaller than the set of the focal parameters and corresponds to a restricted zone within the range of working distances to enhance data capture performance of the terminal.

20 Claims, 4 Drawing Sheets

DATA CAPTURE TERMINAL WITH AUTOMATIC FOCUSING OVER A LIMITED RANGE OF WORKING DISTANCES

DESCRIPTION OF THE RELATED ART

Portable terminals equipped with solid-state imaging systems, in both handheld and hands-free modes of operation, have been used in many applications, such as supermarkets, warehouse clubs, department stores, and other kinds of retailers, as well as package delivery systems, for many years, to electro-optically capture data from various targets, by reading indicia, such as one-dimensional bar code symbols, particularly of the Universal Product Code (UPC) type, each having a row of bars and spaces spaced apart along a scan direction, and by reading two-dimensional symbols, such as Code 49, which introduced the concept of vertically stacking a plurality of rows of bar and space patterns in a single symbol as described in U.S. Pat. No. 4,794,239, as well as by capturing images of non-symbol targets, such as persons, places, or things. For example, the image of a consumer, or the consumer's signature, or the consumer's driver's license might be captured for the purpose of age verification in the event that tobacco or alcoholic products are desired to be purchased. Another example of a two-dimensional code structure for increasing the amount of data that can be read by an imaging system is known as PDF417 and is described in U.S. Pat. No. 5,304,786.

The typically known solid-state imaging system includes an imager having a one- or two-dimensional array of cells or photosensors, which correspond to image elements or pixels in a field of view of the imager, and an imaging lens assembly for capturing light from the target and projecting the captured light onto the imager. Such an imager may include a one- or two-dimensional charge coupled device (CCD) or a complementary metal oxide semiconductor (CMOS) device, and is analogous to the imager used in a digital consumer camera to capture images. The imaging lens assembly includes optical elements for capturing the light over a range of working distances in which the target can be located relative to the terminal.

The known imaging system further typically includes an illuminator to illuminate the target, either a symbol or a non-symbol, during image capture with illumination light emitted from an illumination light source and directed to the target for reflection and scattering as return light therefrom. The illumination light source may be located within and/or externally of the system, and typically comprises one or more light emitting diodes (LEDs). To assist an operator in locating a desired target, the imaging system is sometimes, but not necessarily, equipped with an aiming assembly having an aiming laser for generating a laser beam, and aiming optics for generating a visible aiming pattern, such as a "crosshair" pattern, from the laser beam. The operator trains the aiming pattern on the target to be imaged during an aiming mode prior to image capture. The system yet further includes electronic circuitry for processing electrical signals generated by the imager and indicative of the return light captured by the array, and a microprocessor for either decoding the electrical signals to read the captured image from a symbol target, or for processing the captured image from a non-symbol target for storage and display.

It is therefore known to use a solid-state imaging system for capturing a monochrome image of a target as, for example, disclosed in U.S. Pat. No. 5,703,349. It is also known to use a solid-state imaging system with multiple buried channels for capturing a full color image of the target as, for example, disclosed in U.S. Pat. No. 4,613,895. It is common to provide a two-dimensional CCD with a 640×480 resolution commonly found in VGA monitors, although other resolution sizes are possible. The imaging system can be mounted in a variety of devices, such as computers, cell phones, smartphones, personal digital assistants (PDAs), audio and/or video players, portable gaming systems, radios, video cameras, scanners, pagers, video telephones, and like microprocessor-controlled electronic devices.

It is desirable in many applications that the data from the target be capable of being captured no matter where the target is located in the range of working distances relative to the imager, and that this range be extended over a long distance. For this purpose, it is conventional to provide an automatic focusing feature in which one or more of the optical elements, e.g., focusing lenses, in the imaging lens assembly are automatically and successively moved to a multitude of optical positions between close-in and far-out working distances in the extended range. In each optical position, the microprocessor attempts to capture the data and analyzes the captured data to see if a successful data capture has indeed occurred. This automatic lens movement is typically performed mechanically, and often under the guidance of a rangefinder operative for measuring the distance of the target away from the imager, or under the guidance of a processor that measures the clarity of an image of the target.

However, such automatic focusing is disadvantageous for several reasons. First, the mechanical movement generates vibrations that are propagated through the terminal to an operator's hand in a handheld mode of operation, and may also generate dust to obscure the imaging lens assembly lens assembly, and may cause parts to wear out over time. Moreover, the vibrations can generate objectionable, annoying, audible hum. In addition, the mechanical lens movement requires a drive that, in turn, consumes electrical power, is expensive and slow, can be unreliable, occupies space and increases the overall weight, size and complexity of the terminal. All these factors are aggravated when the number of optical positions is many, and when the range is very long. Also, the rangefinder itself represents added expense, size and complexity.

Although the known automatic focusing data capture terminals are generally satisfactory for their intended purpose, the focusing adjustment performed over a multitude of optical positions typically takes too long. If the focusing adjustment takes on the order of 200 milliseconds or longer, then the terminal will be regarded as sluggish, which operators do not like. A more responsive terminal, e.g., one having data capture times on the order of 50 milliseconds or less, is desired for enhanced operator use and data capture performance.

SUMMARY OF THE INVENTION

One feature of the present invention resides, briefly stated, in a data capture terminal for automatically capturing data from targets located within a range of working distances from the terminal. The terminal advantageously is a microprocessor-controlled electronic device, such as a computer, cell phone, smartphone, personal digital assistant (PDA), audio and/or video player, portable gaming system, radio, video camera, scanner, pager, video telephone, bar code symbol scanner, and like electronic devices. The terminal is preferably configured with a handheld housing supported by a human operator and movable relative to the targets. The housing preferably has a light-transmissive window.

The terminal includes an imaging assembly for focusing and capturing return light reflected and/or scattered from the targets located within the range of working distances through the window over a field of view, and for generating respective electrical signals each indicative of the captured return light. The range of working distances is commonly dictated by the targets used in any particular application. For example, if the application is to capture shipping data on parcel delivery labels or forms, then the size of the overall form may dictate the nearest working distance, such that the entire form can fit within the field of view of the imaging assembly. At the same time, the size of the alphanumeric text of the shipping data printed on the form may dictate the furthest working distance that can be used. Advantageously, the imaging assembly is operative for imaging targets by electro-optically reading indicia, especially one- and/or two-dimensional symbols. Each symbol includes elements of different light reflectivity, e.g., bars and spaces. The imaging assembly preferably includes a one- or two-dimensional, solid-state imager having an array of image sensors, and an imaging lens assembly having at least one focusing lens. Preferably, the array is a CCD or a CMOS array. During symbol reading, a captured image of the symbol is processed and decoded with the aid of a controller or programmed microprocessor.

The imaging assembly preferably includes an illuminator for illuminating the symbol during the reading with illumination light directed from an illumination light source. The illumination light source comprises one or more light emitting diodes (LEDs). The illuminator is especially useful when the imager is operated in low light or dark ambient environments, but could equally well be used at normal indoor lighting levels. An aiming light assembly can be used to generate an aiming light pattern or mark useful to locate the symbol prior to reading.

The controller is operative for processing one of the electrical signals from one of the targets into data indicative of the one target by automatically controlling a set of focal parameters of the imaging assembly. For example, the focusing lens of the imaging assembly may be movable, and the controller is operative, via a motor drive, for mechanically moving the focusing lens to different optical positions, in which an imaging plane is moved along an optical path. As another example, the focusing lens of the imaging assembly may be a variable liquid lens, and the controller is operative, via an electronic drive, for applying different voltages across the liquid lens, thereby changing the imaging plane along an optical path. The different optical positions or voltages constitute the aforementioned focal parameters that are controlled by the controller.

The controller is further operative for determining that the data of the one target has been successfully captured, and for storing one of the focal parameters of the imaging assembly upon a successful determination. The set of focal parameters of the imaging assembly corresponds to the entire range of working distances. Thus, once the controller has determined that a symbol target has been successfully decoded and read, or that a non-symbol target has been successfully processed and displayed, then the particular optical position or the particular voltage is stored, preferably in a memory accessible by the controller.

The controller is still further operative for subsequently processing another of the electrical signals from another of the targets into data indicative of the other target by automatically selecting a subset of the focal parameters determined by the stored one focal parameter, and for determining that the data of the other target has been successfully captured. The subset contains the stored one focal parameter. The subset is smaller than the set of the focal parameters of the imaging assembly and corresponds to a restricted zone within the range of working distances.

Thus, rather than having the controller attempt to capture the data and analyze the captured data in each different optical position, or at each different voltage, throughout the entire extended range of working distances to see if a successful data capture has indeed occurred, one aspect of this invention proposes that such data capture and analysis only occur in a smaller subset of optical positions or voltages, thereby enhancing data capture performance of the terminal. The smaller subset contains the stored position or voltage of the last successful data capture. This invention assumes that the next target will be approximately at or near the same working distance as the last successfully processed target.

Preferably, the stored optical position or voltage is centrally located in the subset, and the controller automatically controls the focusing lens at positions or voltages on both sides of the central stored optical position or voltage. Advantageously, the range has a near subzone and a far subzone, as considered relative to the terminal. The near subzone preferably lies centrally in a working distance of about two to four inches from the window. The far subzone preferably lies centrally in a working distance of about ten inches to infinity from the window. If the stored optical position or voltage is located in the near subzone, then the controller preferably automatically controls the focusing lens and selects more positions or voltages on both sides of the stored optical position or voltage. If the stored optical position or voltage is located in the far subzone, then the controller preferably automatically controls the focusing lens and selects fewer positions or voltages on both sides of the stored optical position or voltage.

Another aspect of the invention resides in a method of automatically capturing data from targets located within a range of working distances from a data capture terminal. The method is performed by focusing and capturing return light from the targets over a field of view of an imaging assembly, generating respective electrical signals each indicative of the captured return light, processing one of the electrical signals from one of the targets into data indicative of the one target by automatically controlling a set of focal parameters of the imaging assembly, determining that the data of the one target has been successfully captured, storing one of the focal parameters of the imaging assembly upon a successful determination, configuring the set of focal parameters of the imaging assembly to correspond to the range of working distances, subsequently processing another of the electrical signals from another of the targets into data indicative of the other target by automatically selecting a subset of the focal parameters determined by the stored one focal parameter, determining that the data of the other target has been successfully captured, containing the stored one focal parameter in the subset, configuring the subset to be smaller than the set of the focal parameters of the imaging assembly, and configuring the subset to correspond to a restricted zone within the range of working distances to enhance data capture performance of the terminal.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
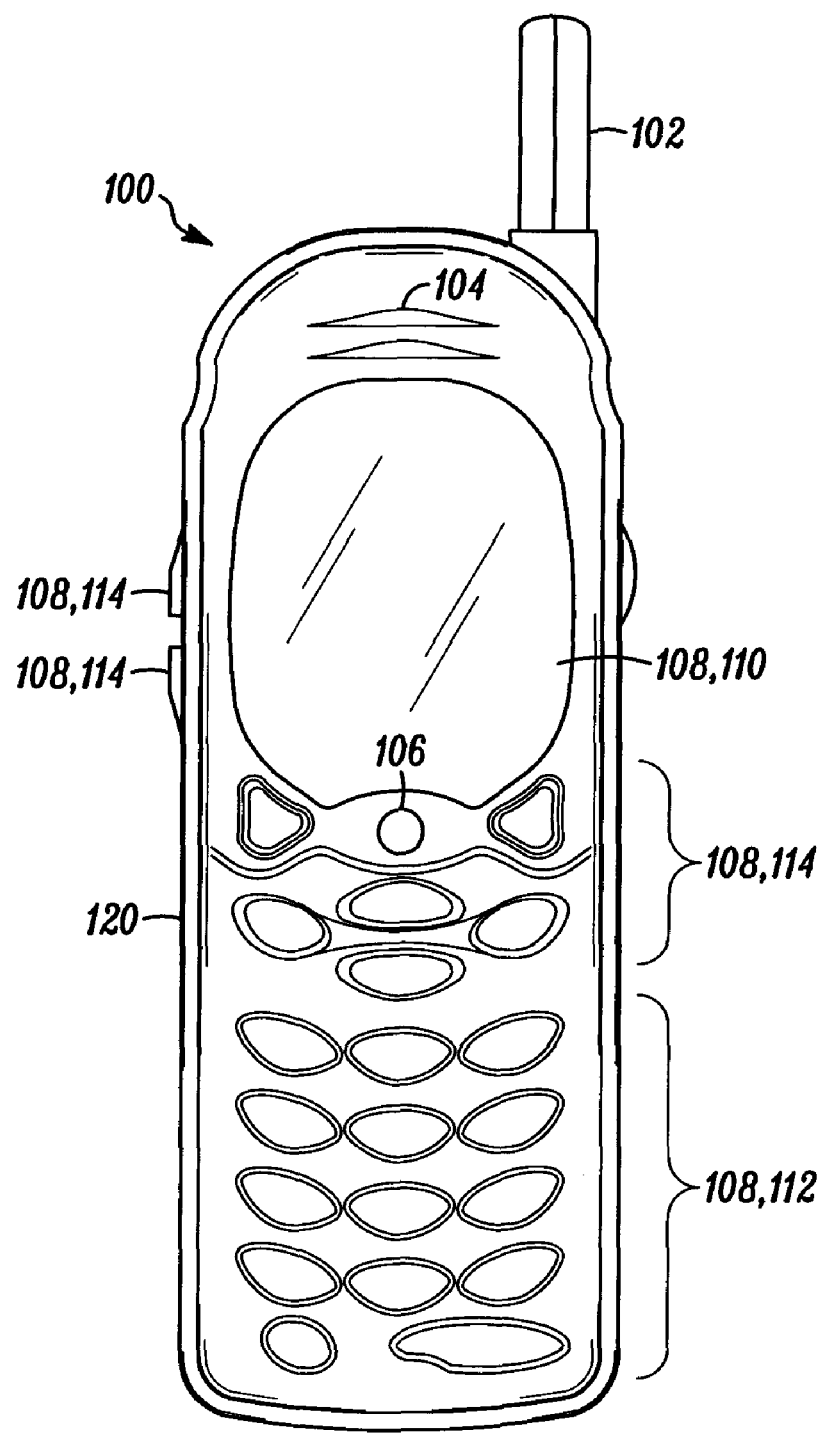
FIG. 1 is a front elevational view of a data capture terminal configured as a radiotelephone, for capturing data from targets in accordance with this invention.

A portable data capture terminal for, and a method of, automatically capturing data from targets, such as bar code symbols and non-symbol targets, according to the present invention, is generally shown in FIG. 1 as a radiotelephone 100, such as a cellular telephone operable in a cellular telephone system. Although a radiotelephone 100 is shown in FIG. 1, one skilled in the art will recognize that the features discussed hereinbelow will also find application in other mobile computers, such as smartphones, personal digital assistants (PDAs), audio and/or video players, portable gaming systems, radios, video cameras, scanners, pagers, video telephones, handheld computers, and other microprocessor-controlled electronic devices, especially those having network access, and the radiotelephone 100 or data capture terminal described herein shall refer to each of these and their equivalents.

As shown in FIG. 1, the radiotelephone 100 includes a housing 120, a radio frequency (RF) antenna 102 for sending and receiving RF signals to and from a cellular base station of a communications network, speaker apertures 104 for directing audio information from an internal speaker to a user or operator, a microphone aperture 106 for directing audio information from the user to an internal microphone, and a user interface 108 for interacting with the user to provide output information to, and receive input information from, the user. The user interface 108 includes, but is not limited to, a liquid crystal display (LCD) 110 that is able to display alphanumeric and graphical image data, a keypad 112, and a plurality of selection buttons 114 at the front and sometimes at the side of the housing 120.

Figure 2:
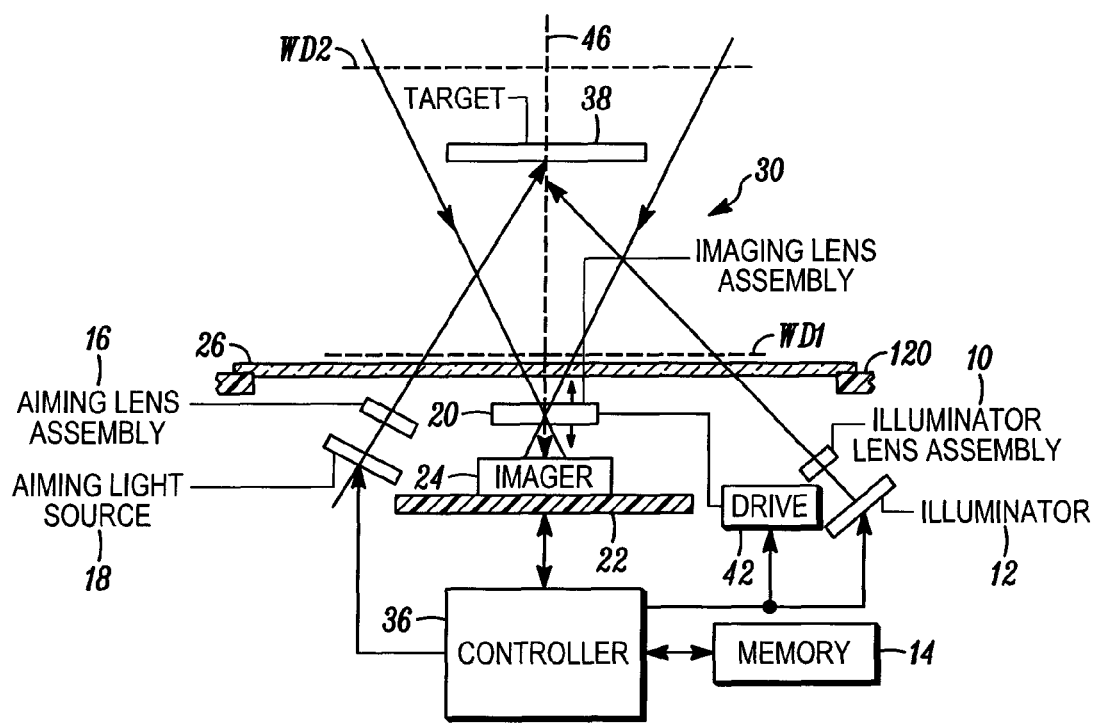
FIG. 2 is a part-diagrammatic, part-sectional view of a housing of the terminal of FIG. 1.

As shown in FIG. 2, the housing 120 has a data capture system 30 behind a generally planar window 26, preferably on a rear of the housing 120. The data capture system 30 is operative for capturing data from targets 38 in a data capture mode of operation, and includes an imager 24 mounted on a printed circuit board 22 in the housing 120. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26, and for generating respective electrical signals each indicative of the captured return light. The return light is scattered and/or reflected from each target 38 over a field of view. The imaging lens assembly 20 includes at least one focusing lens and is operative, under the control of a controller or microprocessor 36, as described below, via a drive 42, for adjustably focusing the return light onto the array of image sensors to enable the target 38 to be processed. The target 38 is located relative to the terminal anywhere in a range of working distances between a close-in working distance (WD1) and a far-out working distance (WD2). In a preferred embodiment, WD1 is about two to four inches from the window 26, and WD2 is about ten inches to infinity from the window 26.

An illuminating assembly is also mounted in the housing 120 and preferably includes an illuminator or illuminating light source 12, e.g., a light emitting diode (LED), and an illuminator lens assembly 10 to uniformly illuminate the target 38 with an illuminating light. The LED 12 is preferably pulsed. An aiming assembly is also optionally mounted in the housing 120 and preferably includes an aiming light source 18, e.g., an LED, and an aiming lens assembly 16 for generating a visible aiming light pattern on the target 38. The aiming pattern is useful to help the operator accurately aim the housing at the target 38. The imager 24, the illuminator light source 12 and the aiming light source 18 are operatively connected to the controller or microprocessor 36 operative for controlling the operation of these components. Preferably, the microprocessor is the same as the one used for processing the respective electrical signals each indicative of the captured return light from the captured target images, and for decoding and reading symbol targets, and for storing and displaying non-symbol targets.

In operation, the housing 120 is held and moved by the operator, and the window 26 is aimed at, or presented to, the target 38, e.g., a symbol, a tag, or a non-symbol person, place or thing. The controller 36, preferably responsive to manual actuation of a trigger, e.g., depression of one of the selector buttons 114, sends a command signal to energize the aiming light source 18 prior to data capture, pulses the illuminator light source 12, and energizes and exposes the imager 24 to collect light, e.g., illumination light and/or ambient light, from the target 38 for a time period of say 500 microseconds or less. A typical array needs about 16-33 milliseconds to acquire the entire target image and operates at a frame rate of about 30-60 frames per second.

The controller 36 is operative for processing one of the electrical signals from one of the targets into data indicative of the one target by automatically controlling a set of focal parameters of the imaging assembly 20. For example, the focusing lens of the imaging assembly 20 may be movable, and the controller 36 is operative, via a drive 42, for mechanically moving the focusing lens to different optical positions, in which an imaging plane is moved along the optical path 46 in order to focus the captured image onto the imager array. As another example, the focusing lens of the imaging assembly 20 may be a variable liquid lens, and the controller 36 is operative, via the drive 42, for applying different voltages across the liquid lens, thereby changing the imaging plane along the optical path 46 in order to again focus the captured image onto the imager array. The different optical positions or voltages constitute the aforementioned focal parameters that are controlled by the controller 36.

The controller 36 is further operative for determining that the data of the one target has been successfully captured, and for storing one of the focal parameters of the imaging assembly 20 upon a successful determination. The set of focal parameters of the imaging assembly 20 corresponds to the entire range of working distances. Thus, once the controller 36 has determined that a symbol target has been successfully decoded and read, or that a non-symbol target has been successfully processed and displayed, then the particular optical position or the particular voltage is stored, preferably in a memory 14 accessible by the controller 36.

The controller 36 is still further operative for subsequently processing another of the electrical signals from another of the targets into data indicative of the other target by automatically selecting a subset of the focal parameters determined by the stored one focal parameter, and for determining that the data of the other target has been successfully captured. The subset contains the stored one focal parameter. The subset is smaller than the set of the focal parameters of the imaging assembly 20 and corresponds to a restricted zone or test region within the range of working distances.

Thus, rather than having the controller 36 attempt to capture the data and analyze the captured data in each different optical position, or at each different voltage, throughout the entire extended range of working distances to see if a successful data capture has indeed occurred, one aspect of this invention proposes that such data capture and analysis only occur in a smaller subset of optical positions or voltages, thereby enhancing data capture performance of the terminal. The smaller subset contains the stored position or voltage of the last successful data capture. This invention assumes that the next target will be approximately at or near the same working distance as the last successfully imaged target.

Figure 3:
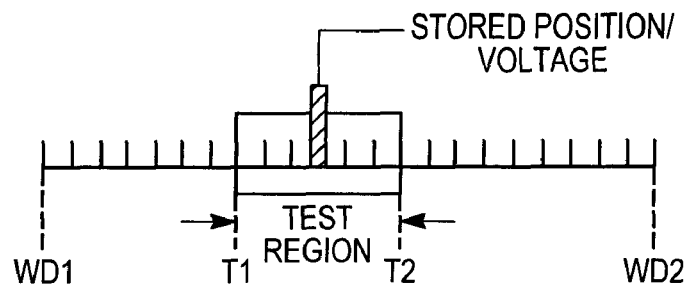
FIG. 3 is a diagram depicting operation of the controller of FIG. 2 in accordance with this invention.

FIG. 3 diagrammatically shows a scale having vertical marks uniformly spaced apart between the close-in distance WD1 and the far-out distance WD2 of the entire range of working distances. These marks depict the multiple optical positions or voltages throughout the entire range. The stored position or voltage of the last successful data capture is diagrammatically depicted by a vertical taller mark. The controller 36 automatically controls the focusing lens and selects a subset of positions or voltages on both sides of the stored optical position or voltage between distances T1 and T2 of a smaller test region within the range. The stored position or voltage is advantageously centrally located in the subset.

Figure 4A:
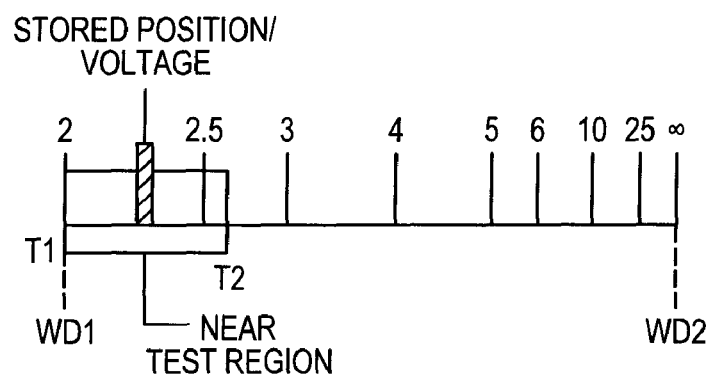
FIG. 4A is a diagram depicting near subzone operation of the controller of FIG. 2 in accordance with this invention.
Figure 4B:
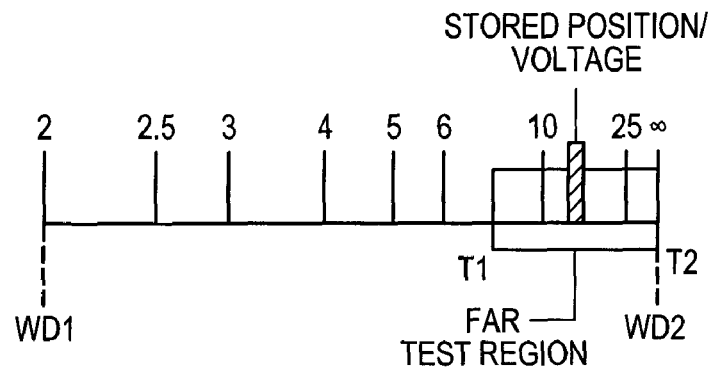
FIG. 4B is a diagram depicting far subzone operation of the controller of FIG. 2 in accordance with this invention.

FIGS. 4A, 4B are analogous to FIG. 3 and diagrammatically show a non-linear scale of the range from two feet to infinity, as considered relative to the terminal. The distances at the near end of the range are greater than the distances at the far end of the range. A near subzone ranging from about two feet to about 2.6 feet from the window 26 is shown in FIG. 4A. A far subzone ranging from about seven feet to infinity from the window 26 is shown in FIG. 4B. If the stored optical position or voltage is located in the near subzone, then the target distances between the positions or voltages within the near test region T1-T2 are smaller. If the stored optical position or voltage is located in the far subzone, then the target distances between the positions or voltages within the far test region T1-T2 are larger.

Figure 5:
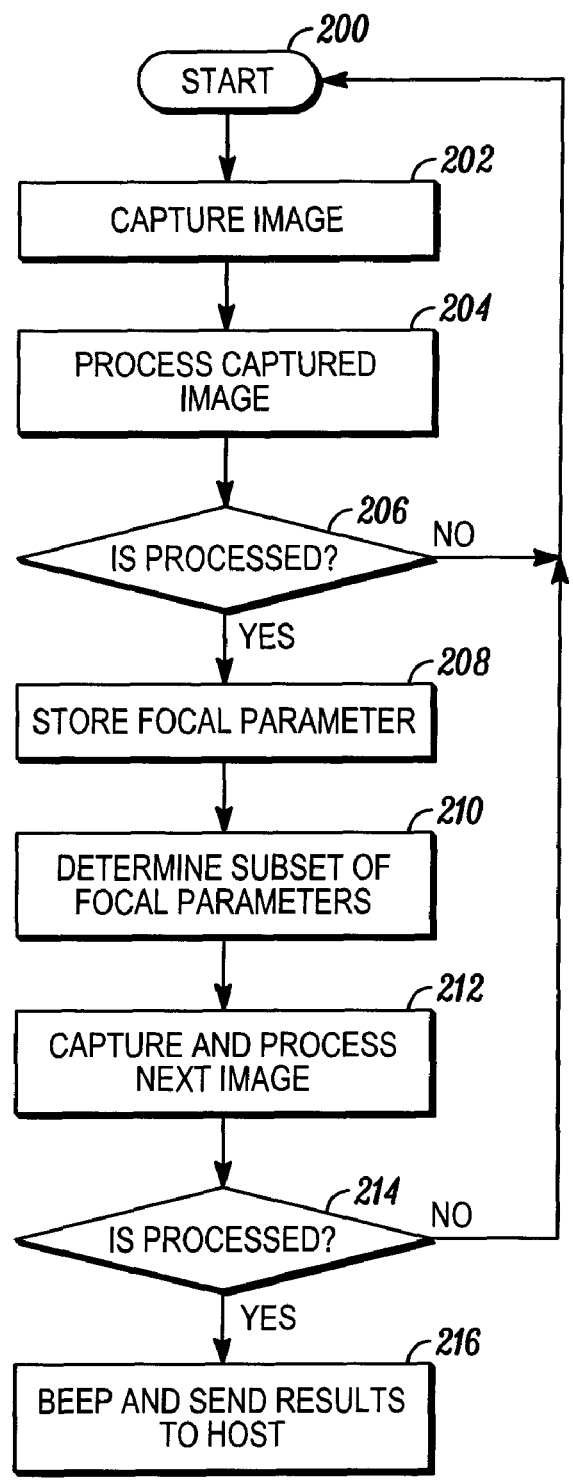
FIG. 5 is a flow chart depicting operation of the terminal of FIG. 1.

FIG. 5 is a flow chart summarizing the above. Starting from start block 200, an image of a first target is captured at block 202, and processed by the controller 36 at block 104, while the controller is adjusting the focal parameters of the imaging assembly 20. If not processed at block 206, then the controller 36 returns to the start block 100 to await another target. If the first target is successfully processed, then the controller 36 stores the focal parameter of the imaging assembly 20 that enabled the successful processing at block 208. In block 210, the controller 36 determines a subset of the focal parameters in which the stored focal parameter is contained. In block 112, an image of a second target is captured, while the controller is only adjusting the subset of the focal parameters of the imaging assembly 20. If not processed at block 212, then the controller 36 returns to the start block 100 to await another target. If the second target is successfully processed, then the controller 36 sends the result to a remote host for further processing at block 216. The storage of the focal parameter is not necessarily performed once during a data capture session, but can advantageously be dynamically performed multiple times during the session. In other words, the storage is preferably continuously updated.

In accordance with this invention, the amount of mechanical movement or voltage adjustment, as well as the number of images to be analyzed, are reduced, thereby resulting in a more responsive auto-focus mechanism. By taking the next image in a restricted range determined after a previous image has been successfully captured, manufacturing variability among groups of terminals, as well as focus-drift among groups of terminals, can be compensated.

It will be understood that each of the elements described above, or two or more together, also may find a useful application in other types of constructions differing from the types described above. Thus, terminals having different configurations can be used.

While the invention has been illustrated and described as a data capture terminal with automatic focusing over a limited range in accordance with a method of performing such data capture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A data capture terminal for automatically capturing data from targets located within a range of working distances from the terminal, comprising:

an imaging assembly for focusing and capturing return light from the targets over a field of view, and for generating respective electrical signals each indicative of the captured return light, wherein the imaging assembly includes a solid-state imager having an array of image sensors; and a controller operative for processing one of the electrical signals from one of the targets into data indicative of the one target by automatically controlling a set of focal parameters of the imaging assembly, for determining that the data of the one target has been successfully captured, and for storing one of the focal parameters of the imaging assembly upon a successful determination, the set of focal parameters of the imaging assembly corresponding to the range of working distances, and the controller being further operative for subsequently processing another of the electrical signals from another of the targets into data indicative of the other target by automatically selecting a subset of the focal parameters determined by the stored one focal parameter, and for determining that the data of the other target has been successfully captured, the subset containing the stored one focal parameter, and the subset being smaller than the set of the focal parameters of the imaging assembly and corresponding to a restricted zone within the range of working distances to enhance data capture performance of the terminal.

2. The data capture terminal of claim 1, wherein the controller is operative for moving the focusing lens to different optical positions that correspond to the focal parameters.

3. The data capture terminal of claim 1, wherein the stored one focal parameter is centrally located in the subset.

4. The data capture terminal of claim 1, wherein the range has a near subzone and a far subzone, as considered relative to the terminal; and wherein the subset has more focal parameters in the near subzone, and has fewer focal parameters in the far subzone.

5. The data capture terminal of claim 4, and a housing having a window through which the return light passes, wherein the near subzone lies centrally in a working distance of about two to four inches from the window, and wherein the far subzone lies centrally in a working distance of about ten inches to infinity from the window.

6. The data capture terminal of claim 1, wherein the target includes a symbol having elements of different light reflectivity, and wherein the controller processes the electrical signals by decoding the elements of the symbol.

7. A data capture terminal for automatically capturing data from targets located within a range of working distances from the terminal, comprising:
imaging means for focusing and capturing return light from the targets over a field of view, and for generating respective electrical signals each indicative of the captured return light, wherein the imaging means includes a solid-state imager having an array of image sensors; and
control means for processing one of the electrical signals from one of the targets into data indicative of the one target by automatically controlling a set of focal parameters of the imaging means, for determining that the data of the one target has been successfully captured, and for storing one of the focal parameters of the imaging means upon a successful determination, the set of focal parameters of the imaging means corresponding to the range of working distances, and
the control means being further operative for subsequently processing another of the electrical signals from another of the targets into data indicative of the other target by automatically selecting a subset of the focal parameters determined by the stored one focal parameter, and for determining that the data of the other target has been successfully captured, the subset containing the stored one focal parameter, and the subset being smaller than the set of the focal parameters of the imaging means and corresponding to a restricted zone within the range of working distances to enhance data capture performance of the terminal.

8. The data capture terminal of claim 7, wherein the imaging means includes an imaging lens assembly having a focusing lens; and wherein the control means is operative for moving the focusing lens to different optical positions that correspond to the focal parameters.

9. The data capture terminal of claim 7, wherein the stored one focal parameter is centrally located in the subset.

10. The data capture terminal of claim 7, wherein the range has a near subzone and a far subzone, as considered relative to the terminal; and wherein the subset has more focal parameters in the near subzone, and has fewer focal parameters in the far subzone.

11. The data capture terminal of claim 10, and housing means having window means through which the return light passes, wherein the near subzone lies centrally in a working distance of about two to four inches from the window means, and wherein the far subzone lies centrally in a working distance of about ten inches to infinity from the window means.

12. The data capture terminal of claim 7, wherein the target includes a symbol having elements of different light reflectivity, and wherein the control means processes the electrical signals by decoding the elements of the symbol.

13. A method of automatically capturing data from targets located within a range of working distances from a data capture terminal, comprising the steps of:
focusing and capturing return light from the targets over a field of view of an imaging assembly, wherein the focusing and capturing step is performed by a solid-state imager having an array of image sensors;
generating respective electrical signals each indicative of the captured return light;
processing one of the electrical signals from one of the targets into data indicative of the one target by automatically controlling a set of focal parameters of the imaging assembly;
determining that the data of the one target has been successfully captured;
storing one of the focal parameters of the imaging assembly upon a successful determination,
configuring the set of focal parameters of the imaging assembly to correspond to the range of working distances;
subsequently processing another of the electrical signals from another of the targets into data indicative of the other target by automatically selecting a subset of the focal parameters determined by the stored one focal parameter;
determining that the data of the other target has been successfully captured;
containing the stored one focal parameter in the subset; and
configuring the subset to be smaller than the set of the focal parameters of the imaging assembly, and configuring the subset to correspond to a restricted zone within the range of working distances to enhance data capture performance of the terminal.

14. The method of claim 13, wherein the focusing and capturing step is performed by an imaging lens assembly having a focusing lens; and wherein the controlling step is performed by moving the focusing lens to different optical positions that correspond to the focal parameters.

15. The method of claim 13, and the step of centrally locating the stored one focal parameter in the subset.

16. The method of claim 13, and configuring the range to have a near subzone and a far subzone, as considered relative to the terminal; and configuring the subset to have more focal parameters in the near subzone, and fewer focal parameters in the far subzone.

17. The method of claim 16, and the step of passing the return light through a window of a housing; and configuring the near subzone to lie centrally in a working distance of about two to four inches from the window, and configuring the far subzone to lie centrally in a working distance of about ten inches to infinity from the window.

18. The method of claim 13, and configuring the target as a symbol having elements of different light reflectivity, and wherein the processing steps are performed by decoding the elements of the symbol.

19. The method of claim 13, wherein the step of automatically selecting the subset of the focal parameters is performed periodically during a data capture session.

20. The method of claim 13, wherein the step of automatically selecting the subset of the focal parameters is performed after each successful data capture.

* * * * *